United States Patent
Barnard et al.

(10) Patent No.: US 10,128,886 B1
(45) Date of Patent: Nov. 13, 2018

(54) RADIO FREQUENCY (RF) RECEIVERS AND METHODS TO SPREAD SPECTRAL ENERGY OF SPURIOUS OUTPUTS

(71) Applicant: KEYSIGHT TECHNOLOGIES, INC., Loveland, CO (US)

(72) Inventors: Michael E. Barnard, Windsor, CA (US); Thomas A. Gray, Santa Rosa, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 15/275,975

(22) Filed: Sep. 26, 2016

(51) Int. Cl.
*H04B 1/26* (2006.01)
*H04L 27/22* (2006.01)

(52) U.S. Cl.
CPC .............. *H04B 1/26* (2013.01); *H04L 27/22* (2013.01)

(58) Field of Classification Search
USPC .......................................... 455/313–333, 296
See application file for complete search history.

(56) References Cited

U.S. PATENT DOCUMENTS

| | | | | |
|---|---|---|---|---|
| 4,333,080 A | * | 6/1982 | Collins ................. | G01S 13/282 342/194 |
| 4,687,330 A | * | 8/1987 | Lefevre ................. | G01C 19/726 356/464 |
| 5,301,058 A | * | 4/1994 | Olshansky ............ | G02F 1/0327 359/246 |
| 5,564,097 A | * | 10/1996 | Swanke ................. | H03D 7/165 455/296 |
| 5,719,905 A | * | 2/1998 | Cohen .................... | H04B 15/00 455/315 |
| 8,400,349 B1 | | 3/2013 | Dubbert et al. | |
| 2007/0152874 A1 | | 7/2007 | Woodington | |
| 2010/0253400 A1 | * | 10/2010 | Lai ........................ | H03L 7/0991 327/156 |
| 2014/0018014 A1 | | 1/2014 | Modha et al. | |
| 2015/0015238 A1 | | 1/2015 | Wertz | |
| 2016/0126988 A1 | | 5/2016 | Mester et al. | |

FOREIGN PATENT DOCUMENTS

WO 1996001006 A1 1/1996

\* cited by examiner

*Primary Examiner* — Lana N Le (57) ABSTRACT

Radio frequency (RF) receivers and methods to spread spectral energy of spurious responses of mixers over a frequency band are disclosed. For example, a receiver includes first and second mixers, and first and second variable frequency oscillators (VFOs). The first mixer is configured to receive an RF signal and provide an intermediate frequency (IF) signal. The second mixer is coupled with the first mixer and configured to receive the IF signal and provide a baseband signal. The first VFO is coupled with the first mixer and configured to provide a first angle modulated LO signal. The second VFO is coupled with the second mixer and configured to provide a second angle modulated LO signal. The first and second mixers provide a stable frequency downconversion.

19 Claims, 6 Drawing Sheets

RADIO FREQUENCY (RF) RECEIVERS AND METHODS TO SPREAD SPECTRAL ENERGY OF SPURIOUS OUTPUTS

BACKGROUND

The superheterodyne receiver is a commonly used receiver to step-down and recover (i.e. demodulate) a baseband signal from a received radio frequency (RF) signal. A first stage mixer is used to step down the RF signal to an intermediate frequency (IF) signal, and a demodulator is used to recover the baseband signal from the IF signal. The demodulator can include a second stage mixer that is used to step down the IF signal and recover the baseband signal. For in-phase (I) quadrature (Q) demodulation the second stage can use two mixers.

A common problem with superheterodyne receivers is that mixers are not ideal and can provide unwanted spurious outputs (i.e. spurs) and images that may require complex circuitry to filter. In some applications images and spurs may fall within the frequency range of the baseband signal. One technique to reduce the spectral energy of the spurs is to increase the local oscillator (LO) power of the offending mixer. Another technique is to reduce the RF input power. However, both techniques may degrade the overall signal-to-noise ratio (SNR) of the receiver. Narrowband filtering of the RF input and the down-converted signal may also be used to attenuate spurs and unwanted images at a cost of bandwidth of the receiver. Image rejection mixers can be used as well. However, temperature stability can be an issue with image rejection mixers. More limiting and complex techniques involve digitally capturing the output spectrum of the mixer at two offset LO frequencies. By observing frequency shifts, certain spurs can be identified and removed mathematically by software. A major disadvantage to this technique is that it requires batch mode processing and is not practical for real-time applications.

Spurs can also be generated when using time interleaved analog-to-digital converters (ADCs) in receivers. These types of spurs can be attenuated by measuring time and frequency errors and then compensating for these errors with a programmable finite impulse response (FIR) filter. However, these errors tend to be unstable and also sensitive to temperature. A calibration signal is required and adds complexity to the circuitry. Also, digital programmable FIR filters require high gate counts in the application specific integrated circuit (ASIC), field programmable gate array (FPGA), or digital signal processing (DSP) platforms.

For at least the aforementioned reasons, there is a need for improved techniques for reducing spectral energy of spurs and unwanted images generated in RF receivers that fall within the frequency range of the baseband signal.

BRIEF DESCRIPTION OF THE DRAWINGS

The illustrated embodiments of the disclosed subject matter will be best understood by reference to the drawings, wherein like parts are designated by like numerals throughout. The following description is intended only by way of example, and simply illustrates certain selected embodiments of devices, systems, and processes that are consistent with the disclosed subject matter as claimed herein.

DETAILED DESCRIPTION

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only, and is not intended to be limiting. The defined terms are in addition to the technical and scientific meanings of the defined terms as commonly understood and accepted in the technical field of the present teachings. As used in the specification and appended claims, the terms 'a', 'an' and 'the' include both singular and plural referents, unless the context clearly dictates otherwise. Thus, for example, 'a device' includes one device and plural devices.

The described embodiments relate to receivers. Particularly, the presently disclosed subject matter relates to RF superheterodyne receivers. Methods to spread spectral energy of spurs and unwanted images over a frequency band are disclosed herein.

Figure 1:
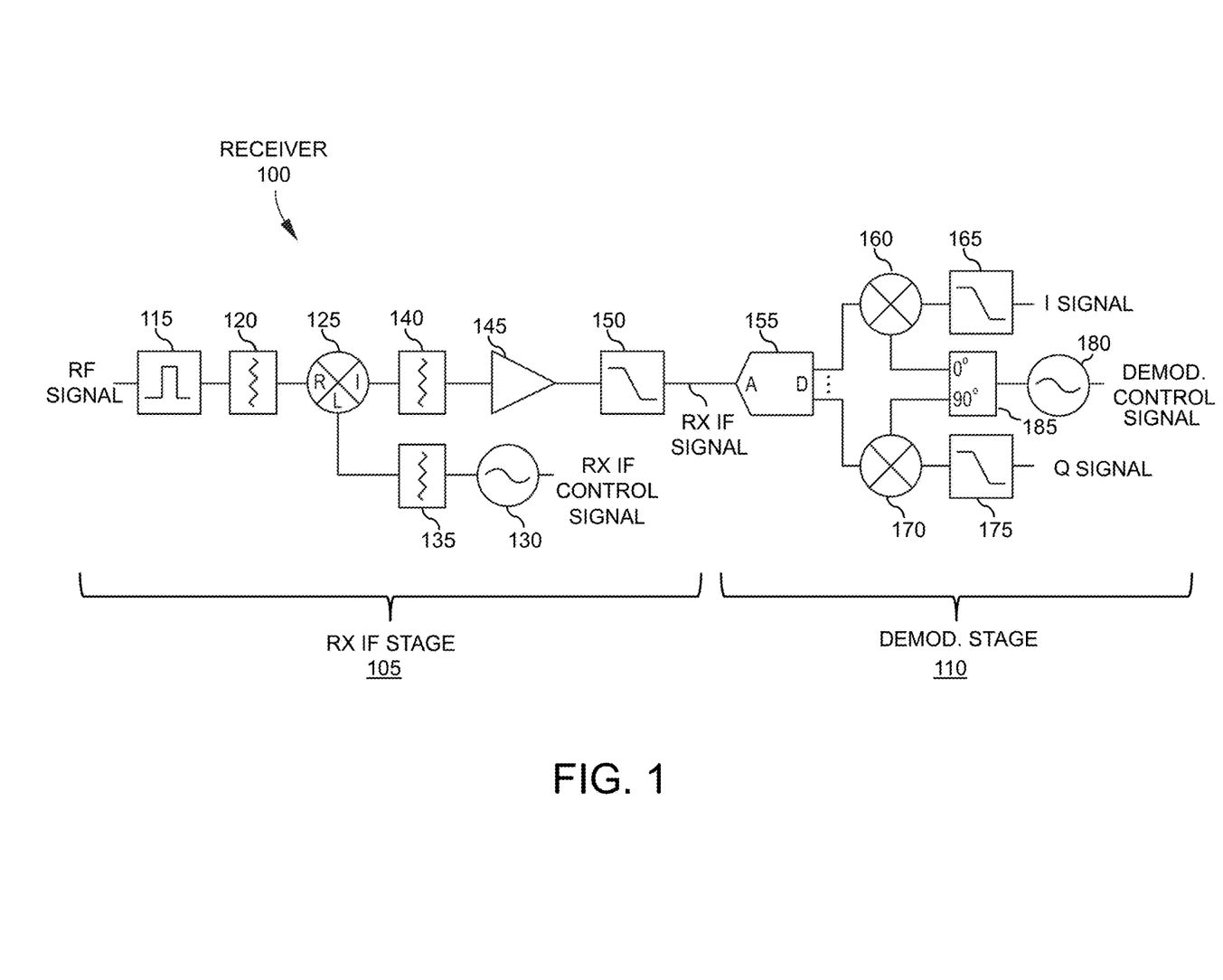
FIG. 1 is a diagram of a receiver configured as an RF superheterodyne receiver in accordance with embodiments of the present disclosure.

FIG. 1 illustrates a diagram of a receiver 100 configured as an RF superheterodyne receiver for processing an RF signal in accordance with a representative embodiment of the present disclosure. A frequency range of the RF signal may be between 3 Hertz (Hz) and 300 Giga-Hertz (GHz). The receiver 100 may be implemented within signal input circuitry of a test device. For example, the test device may be a spectrum analyzer, a vector signal analyzer (VSA), or a vector network analyzer (VNA). The RF signal may occupy a frequency bin (i.e. frequency band) of interest to a user of the test device.

The receiver 100 is configured to provide a method for spreading spectral energy of spurs and unwanted images over the frequency bin. The method includes mixing and filtering the RF signal with a first angle modulated local oscillator (LO) signal to provide a receive (Rx) intermediate frequency (IF) signal. Angle modulation may include frequency or phase modulation. The method also includes mixing and filtering the Rx IF signal with a second angle modulated LO signal to provide a baseband signal. The first and second angle modulated LO signals are coherent and provide a stable (i.e. stationary) frequency downconversion of the RF signal while spreading the spectral energy of the spurs and unwanted images. Specifically, the first and second angle modulated LO signals have a linear relationship wherein the angle modulation of the second signal has a cancelling effect to the angle modulation of the first signal in relation to the frequency downconversion.

The receiver 100 includes an Rx IF stage 105 and a demodulator stage 110 configured to provide a two-step frequency downconversion. The Rx IF stage 105 is configured to provide a first step frequency downconversion of the RF signal to the IF signal. The demodulator stage 110 is configured to provide a second step frequency downconversion of the IF signal to a complex baseband signal. The complex baseband signal includes in-phase (I) and quadrature (Q) signals. The I and Q signals represent magnitude and phase components of the complex baseband signal. The I and Q signals may include at least one of an amplitude modulated (AM), frequency modulated (FM), or phase modulated (PM) signal. In other embodiments the I and Q signals may represent magnitude and phase components of a quadrature amplitude modulated (QAM) signal, a vestigal side band (VSB) signal, a quadrature phase shift keyed (QPSK) signal, an orthogonal frequency division multiplexed (OFDM) signal, a carrierless AM/PM (CAP) signal, a code division multiple access (CDMA) signal, or a wavelet modulated signal. In other embodiments, the demodulator stage 110 may provide a single-ended or a differential baseband signal.

The Rx IF stage 105 includes an RF bandpass filter 115, an attenuator 120, and an IF mixer 125 (first mixer). The RF bandpass filter 115 is configured to receive the RF signal and attenuate out-of-band frequency components. An input of the RF bandpass filter 115 may be directly coupled with an antenna (not shown in FIG. 1) that is configured to receive the RF signal wirelessly over the air. The input of the RF bandpass filter 115 may be a balanced or an unbalanced input. In other embodiments, at least one of an RF splitter or an RF switch may be coupled between the antenna and the input of the RF bandpass filter 115. In other embodiments, the input of the RF bandpass filter 115 may be coupled to a low noise amplifier (LNA) that is configured to boost a power level of the RF signal. In other embodiments, the input of the RF bandpass filter 115 may be coupled with a coax cable, a transmission line, an impedance matching transformer, or a resistive pad. The RF bandpass filter 115 may be an active or a passive bandpass filter. The RF bandpass filter 115 may include a series or a parallel resonant circuit and may include at least one capacitor and at least one inductor. In other embodiments, the RF bandpass filter 115 may include a low pass filter cascaded in series with a high pass filter. Pass bands of the low pass and high pass filters may overlap to form a passband of the RF bandpass filter 115. In other embodiments, the RF bandpass filter 115 may include at least one of a surface acoustic wave (SAW) filter or a bulk acoustic wave (BAW) filter. An output of the RF bandpass filter 115 may be a balanced or an unbalanced output.

The attenuator 120 couples the RF bandpass filter 115 with an input port of the IF mixer 125. An input of the attenuator 120 may be a balanced or an unbalanced input. The attenuator 120 may be a passive (e.g. resistive) attenuator and may be implemented in at least one of an "L", a "T", or a "H" configuration. The attenuator 120 may also include a variable resistor. The attenuator 120 may be a switched attenuator having a plurality of cascaded attenuator stages. In other embodiments, the attenuator 120 may be an active attenuator including at least one transistor. The attenuator 120 may provide impedance matching and power level adjustment of the RF signal level for the input port of the IF mixer 125. An output of the attenuator 120 may be a balanced or an unbalanced output.

The IF mixer 125 includes the input port, a local oscillator (LO) port, and an output port. The IF mixer 125 provides the IF signal at the output port and has a frequency that is an RF signal frequency minus a frequency provided to the LO port. The IF mixer 125 may be a non-linear device including at least one of a diode or a transistor. The IF mixer 125 may be a Schottky diode mixer. In other embodiments the IF mixer 125 may be at least one of a single balanced mixer or a double balanced mixer that includes two single balanced mixers.

The Rx IF stage 105 also includes an IF VFO 130 (first VFO), attenuators 135 and 140, an amplifier 145, and an IF low pass filter 150. The attenuator 135 couples an output of the IF VFO 130 with the LO port of the IF mixer 125 and may be configured as described in any of the embodiments of the attenuator 120. The attenuator 120 may also provide impedance matching and power level adjustment for the LO port of the IF mixer 125.

The IF VFO 130 is configured to provide the first angle modulated LO signal for the LO port of the IF mixer 125. An Rx IF control signal may trigger a modulation cycle of the IF VFO 130. The IF control signal may be a digital control signal and the first angle modulated LO signal may be an analog LO signal. The IF control signal may be provided by a processor, an ASIC, an FPGA, a DSP, or discrete digital logic components. The modulation cycle may be generated by circuitry within the IF VFO 130.

The attenuator 140 couples an output of the IF mixer 125 with an input of the amplifier 145. The attenuator 140 may 115 provide impedance matching and power level adjustment for the input of the amplifier 145. The attenuator 140 may be configured as described in any of the embodiments of the attenuator 120.

The input of amplifier 145 may be a balanced or an unbalanced input. The amplifier 145 may include at least one transistor and may be a fixed gain or a variable gain amplifier. A digital gain of the amplifier 145 may be controlled by a processor, an ASIC, an FPGA, or a DSP. An output of the amplifier 145 is coupled with an input of the IF low pass filter 150 and may be a balanced or an unbalanced output.

An output of the IF low pass filter 150 is coupled with an ADC 155 of the demodulator stage 110. The IF low pass filter 150 may be an active or a passive low pass filter, and may include at least one capacitor and at least one inductor. An output of the IF low pass filter 150 may be a balanced or an unbalanced output. The IF low pass filter 150 may be configured to attenuate out-of-band energy of the IF signal from the IF mixer 125. The amplifier 145 may be configured to provide power level adjustment for the IF signal for the ADC 155. In other embodiments, the IF low pass filter 150 may be a band pass filter and may be configured as described in any of the embodiments of the RF bandpass filter 115. The ADC 155 may be at least one of a Flash ADC, a Sigma-delta ADC, a dual slope converter, or a successive approximation converter. A sampling frequency of the ADC 155 be a least two times of a highest frequency of the IF signal and the ADC 155 may include a voltage reference.

In addition to the ADC 155, the demodulator stage 110 includes an I mixer 160 (second mixer) 160 and first low pass filter 165 to provide the I signal. The demodulator stage 110 also includes a Q mixer 170 and second low pass filter 175 to provide the Q signal. A demodulator VFO 180 (second VFO) is coupled with the LO inputs of the I and Q mixers 160 and 170 using a quadrature phase splitter 185. The demodulator VFO 180 is configured to provide the second angle modulated LO signal at a first phase (i.e. sine phase) is provided to the LO port of the I mixer 160. The second angle modulated LO signal is provided at a second phase (i.e. cosine phase) to the LO port of the Q mixer 170. The second phase is shifted 90 degrees relative to the first phase. A demodulator control signal may trigger a modulation cycle of the demodulator VFO 180. The demodulator stage 110 may be substantially digital circuitry and be implemented in at least one of an ASIC, an FPGA, or a DSP platform. The I and Q mixers 160 and 170 may be coordinate rotation digital computer (CORDIC) mixers or conventional digital multipliers. The first and second low pass filters 165 and 175 may be FIR or infinite impulse response (IIR) digital filters. The quadrature phase splitter 185 may include at least one of a digital delay, a look up table, or mathematical computational circuitry to provide the first and second phases.

The modulation cycles of the IF and demodulator VFOs 130 and 180 are configured to provide the stable (i.e. stationary) frequency downconversion of the receiver 100 while attenuating spectral energy of spurs over a given frequency bin (i.e. frequency band). The Rx IF stage 105 and the demodulator stage 110 may also have an improved spurious-free-dynamic-range (SFDR) over a superheterodyne receiver wherein the LO ports of the mixers are not angle modulated.

In other embodiments, the IF VFO 130 may provide a direct digitally synthesized sine wave. The IF VFO 130 may include at least one of a reference oscillator, a frequency control register, a numerically controlled oscillator (NCO), a DAC, and a reconstruction filter. The demodulator VFO 180 may also include a reference oscillator and an NCO. A DAC and a reconstruction filter may not be included in the demodulator VFO 180 when the I and Q mixers 160 and 170 are digital mixers. The reference oscillators of the IF and demodulator VFOs 130 and 180 may also be phase-locked at a common lower frequency.

In other embodiments, the modulation cycle of the demodulator VFO 180 may be time-delayed to the modulation cycle of the IF VFO 130. As such the Rx IF control and demodulator control signals may also be configured as triggers to adjust a delay between the modulation cycles. The delay may be set to match a propagation delay of the IF signal between the IF mixer 125 and the I and Q mixers 160 and 170 of the demodulator stage 110. To measure this propagation delay, the receiver 100 may be configured with modulation off for both the IF VFO 130 and the demodulator VFO 180. A trigger of the Rx IF control may initiate modulation for the IF VFO 130 and a time between the trigger and a transient on the I and Q signals may be measured to calculate the propagation delay. In other embodiments, digital circuitry may be included in the demodulator stage 110 for measuring the propagation delay.

Figure 2:
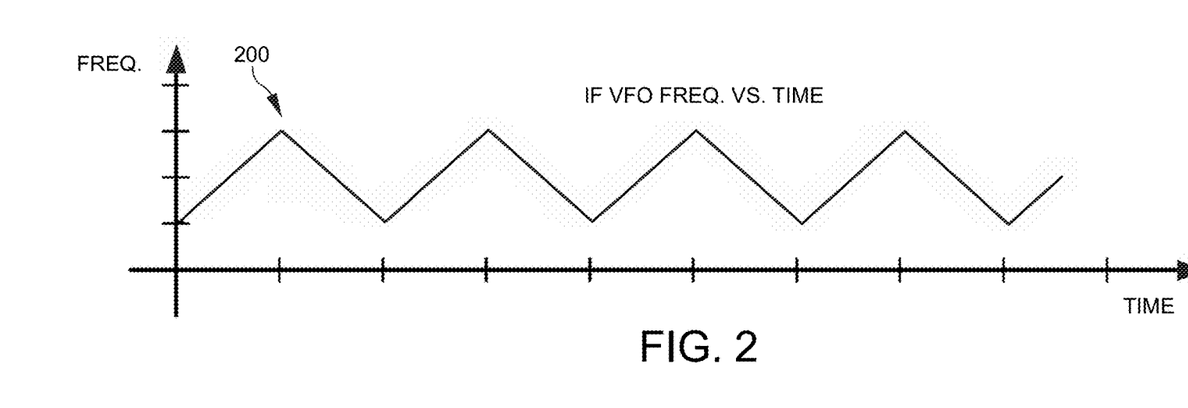
FIG. 2 is a graph of frequency deviation versus time for linear chirping of a first variable frequency oscillator (VFO) in accordance with embodiments of the present disclosure.
Figure 3:
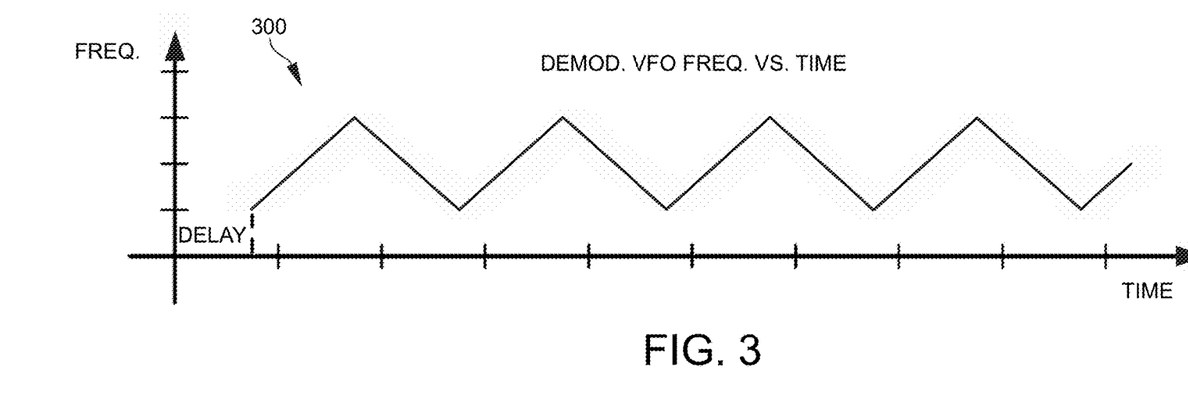
FIG. 3 is a graph of frequency deviation versus time for linear chirping of a second VFO relative to the first VFO in accordance with embodiments of the present disclosure.

The first and second angle modulated LO signals may also have a coherent relationship. For example, the IF VFO 130 and the demodulator VFO 180 may be linearly chirped (i.e. frequency swept) using inverse triangle waveforms. FIG. 2 illustrates a graph 200 of frequency deviation (using inverse triangle waveforms) versus time for the IF VFO 130. FIG. 3 illustrates a graph 300 of frequency deviation versus time for the demodulator VFO 180. As shown, the IF VFO 130 and the demodulator VFO 180 are linearly chirped such that frequency downconversion remains stable (i.e. stationary) in real-time. A propagation delay between the modulation cycles is also shown in FIG. 3. In other embodiments, the IF VFO 125 and the demodulator VFO 180 may be non-linear chirped. For example, inverse sinewaves having delayed modulation cycles may be used to vary the frequencies of the IF and demodulator VFOs 130 and 180. In other embodiments, inverse sawtooth waveforms may be used.

Figure 4:
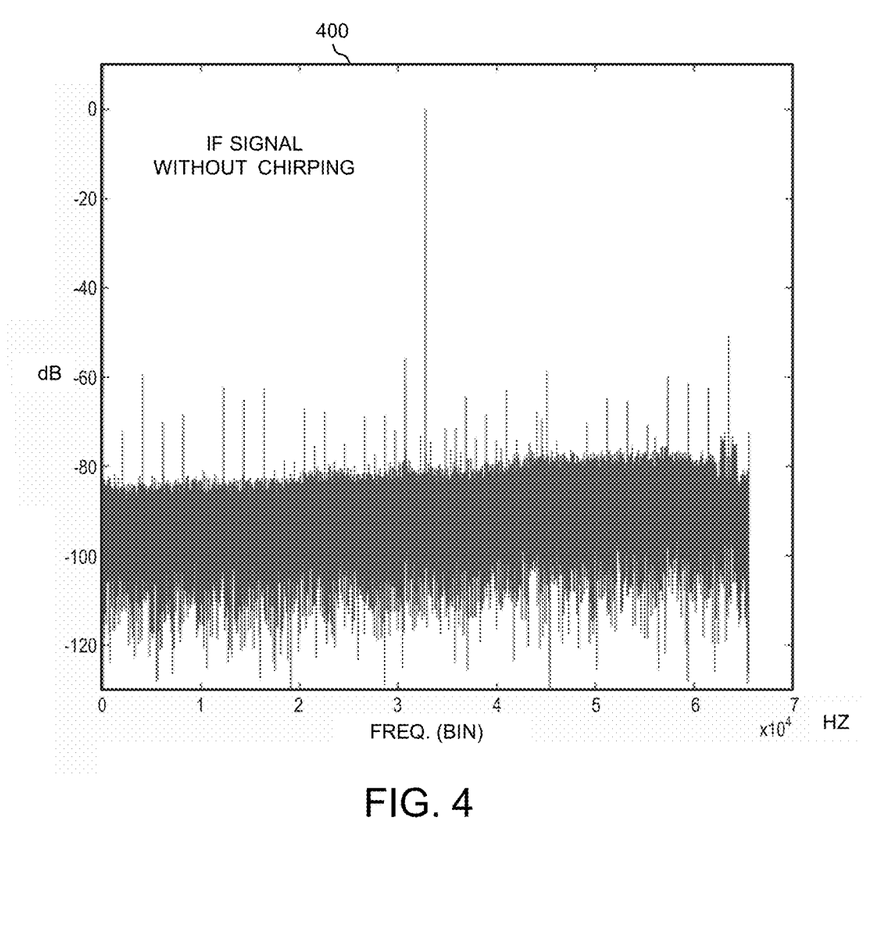
FIG. 4 is a graph of IF signal power within a frequency bin without frequency modulation of the first and second VFOs in accordance with embodiments of the present disclosure.
Figure 5:
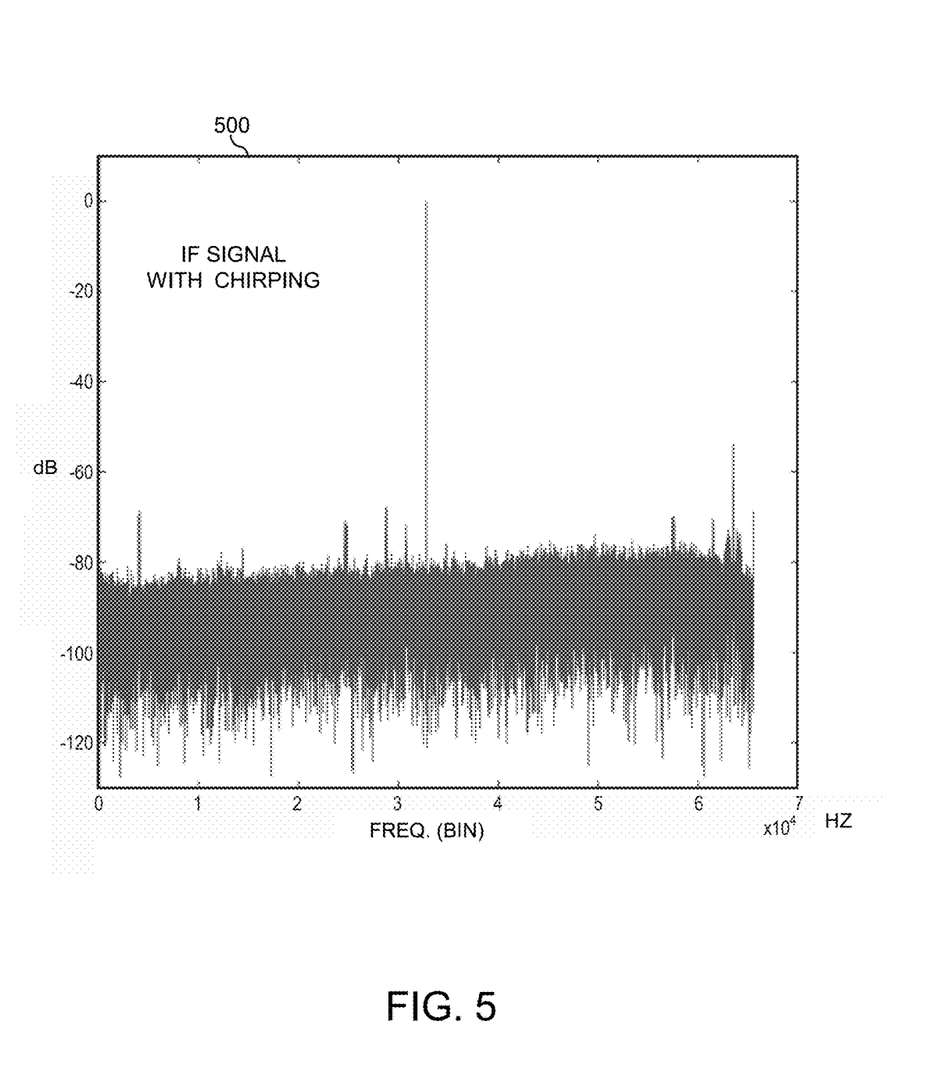
FIG. 5 is a graph of IF signal power within the frequency bin with linear chirping of the first and second VFOs in accordance with embodiments of the present disclosure.

FIG. 4 illustrates a graph 400 of an IF signal power within a frequency bin without frequency modulation of the IF and demodulator VFOs 130 and 180. FIG. 5 is a graph 500 illustrating the IF signal power within the same frequency bin with the linear chirping using the inverse triangle waves of FIG. 2 and FIG. 3. As shown the spectral energy of the spurs of FIG. 4 is greatly reduced in FIG. 5. The spectral energy of the spurs is frequency spread across multiple frequency bins. The amount of frequency spread is dependent on the type of spur and a chirp bandwidth (i.e. frequency deviation).

Spurs from the ADC 155 may be spread in frequency by the chirp bandwidth. Harmonics of the RF input signal may be spread in frequency by a multiple of the chirp bandwidth, set by the order of the given harmonic minus one. For example, a second order spur may be spread by the chirp bandwidth. Intermodulation products are similar to harmonics. They may also be spread by the order of the largest harmonic minus one. Mixer generated spurs may be spread by the order of the LO input frequency component of the spur minus one. As such, a 3×3 spur may be spread by twice the chirp bandwidth. Images may be chirped in the opposite frequency trajectory and therefore may be spread by the chirp bandwidth. When the complex baseband spectrum of the I and Q signals are observed with a given resolution bandwidth (RBW), the spread spurious signals may occupy multiple frequency bins. As such, spurious energy on a per RBW frequency bin basis may be reduced by the ratio of the RBW to the chirp bandwidth. When the receiver 100 is implemented in the input signal circuitry of a spectrum analyzer, VSA, or VNA; spurious spectral energy is spread and SFDR is improved for a given RBW.

The architecture of the receiver 100 may be applied to existing superheterodyne receiver architectures. As such, additional stages to the analog down-conversion chains may not be needed and power levels of RF and LO inputs of IF mixers may be optimized for SFDR without decreasing the SNR of the superheterodyne receiver. Since spurs are mitigated digitally (i.e. temperature insensitive), spurious reduction remains stable over an operating temperature range. In addition to mixer and ADC generated spurs, unwanted images and harmonics may also be attenuated using much less digital circuitry than required in FIR filter implementations.

In other embodiments, the receiver 100 may be included in signal input circuitry of a radar system. The receiver 100 may also be implemented within signal input circuitry of an AM radio receiver, a FM radio receiver, or a broadcast TV receiver.

In other embodiments, the receiver 100 may be implemented within signal input circuitry of a wireless communication testing device, a radar testing device, or a wired broadband access testing device. The receiver 100 may also be implemented within signal input circuitry of a communication device, such as a standard base station, a picocell, a femtocell, a microcell, a wireless local area network (WLAN) access point, a smart phone, a smart watch, a smart TV, a tablet, or a laptop.

In other embodiments, the receiver 100 may be configured as a sub-millimeter wave receiver configured to process an input signal above 300 GHz (i.e. sub-millimeter wave frequencies). The sub-millimeter receiver may be coupled with a waveguide configured to receive the input signal. The RF bandpass filter may include a transmission line stub filter. In other embodiments, the RF bandpass filter may include waveguide technology. The IF mixer 125 may include a corner cube mixer. The IF VFO 130 may also include a phase-locked-loop to multiply the frequency of the output of an NCO from an RF frequency to a sub-millimeter wave frequency. In other embodiments the phase-locked-loop may be replaced by a frequency multiplier circuit including a nonlinear component and a bandpass filter. The demodulator stage 110 may implemented as described in the receiver 100 of FIG. 1. The sub-millimeter receiver may be implemented in an imaging device, a communication device, or a test device.

In other embodiments, the receiver 100 may be configured as an optical receiver to process an optical signal in the infrared spectral region between 300 GHz and 300 Tera-Hertz (THz). In other embodiments, the optical signal may be in the ultraviolet spectral region above 300 THz. The optical receiver may be coupled with an optical amplifier, a lens, or an optical fiber to receive the optical signal. The RF bandpass filter 115 may be replaced with an optical filter. The optical filter may be implemented within the lens or the optical fiber. The attenuators 120, 135, and 140 may be replaced with optical attenuators. The IF mixer 125 may be replaced with an optical mixer that may include at least one non-linear optical component. The IF VFO 130 may be replaced with a linear chirped optical source including a laser. The amplifier 145 may be replaced with an optical detector and transimpedance amplifier to convert the Rx IF signal from optical to electrical. The demodulator stage 110 may implemented as described in FIG. 1. The optical receiver may be implemented within an optical test device or an optical communication device. The optical receiver may also be implemented as a module including a photonic integrated circuit for the Rx IF Stage 105 and semiconductor circuitry for the demodulator stage 110.

In other embodiments, the receiver 100 may be implemented within any device or system requiring frequency downconversion and spectral spreading of spurs or unwanted images using one or more frequency mixers.

Figure 6:
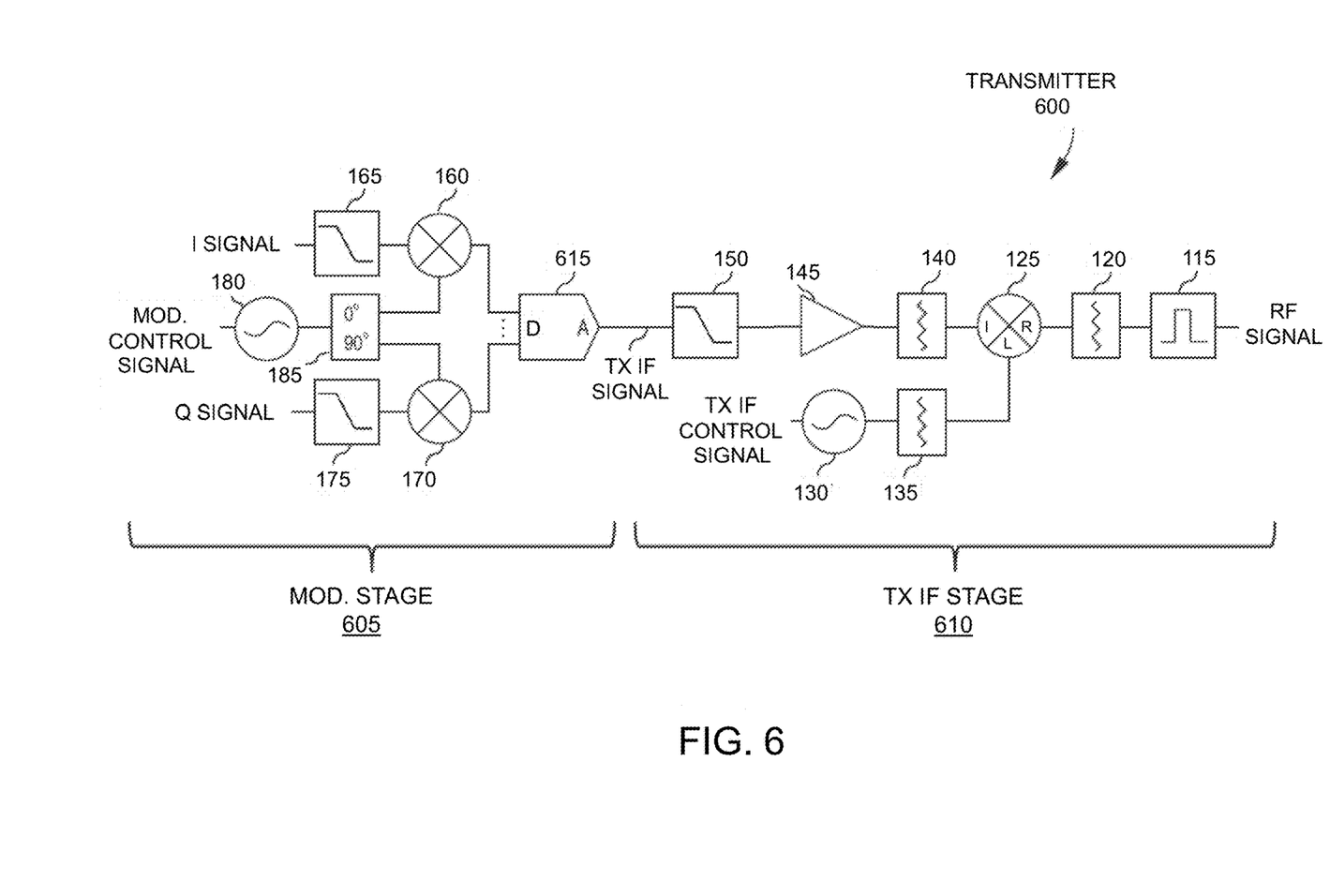
FIG. 6 is a diagram of an RF transmitter configured as an RF superheterodyne transmitter in accordance with embodiments of the present disclosure.

FIG. 6 illustrates a diagram of a transmitter 600 configured as an RF superheterodyne transmitter for providing an RF signal in accordance with another representative embodiment of the present disclosure. A frequency range of the RF signal may be between 3 Hertz (Hz) and 300 Giga-Hertz (GHz). The transmitter 100 may be implemented within a test device to provide a reference signal. As disclosed in FIG. 1 the test device may be a spectrum analyzer, a VSA, or a VNA. The RF signal may be used to calibrate the test device.

The transmitter 600 is configured to provide a method for spreading spectral energy of spurs and unwanted images over a frequency band. The method includes mixing and filtering a baseband signal with a first angle modulated LO signal to provide a transmit (Tx) IF signal. The method also includes mixing and filtering the Tx IF signal with a second angle modulated LO signal to provide the RF signal. The first and second angle modulated LO signals are coherent and provide a stable (i.e. stationary) frequency upconversion of the baseband signal while spreading the spectral energy of the spurs and unwanted images.

The transmitter 600 includes a modulator stage 605 coupled with a Tx IF stage 610 configured to provide a two-step frequency upconversion. The modulator stage 605 is configured to provide a first step frequency upconversion of a complex baseband signal to the Tx IF signal. The complex baseband signal includes I and Q signals. The Tx IF stage 610 is configured to provide a second step frequency upconversion of the Tx IF signal to the RF signal. In other embodiments, the modulator stage 605 may be configured to receive a single-ended or a differential baseband signal.

The modulator stage 605 may be substantially digital circuitry and be implemented in at least one of an ASIC, an FPGA, or a DSP platform. A first low pass filter 165 couples the I signal with an input of an I mixer 160 (first mixer). A second low pass filter 175 couples the Q signal with an input of a Q mixer 170. The I and Q signals may represent magnitude and phase components of a QAM signal, a VSB signal, a QPSK signal, an OFDM signal, a CAP signal, a CDMA signal, or a wavelet modulated signal. The first and second low pass filters 165 and 175 may be FIR or infinite impulse response (IIR) digital filters.

A modulator VFO 180 (first VFO) is coupled with the LO inputs of the I and Q mixers 160 and 170 using a quadrature phase splitter 185. The first angle modulated LO signal as a first phase (i.e. sine phase) is provided to the LO port of the I mixer 160. The first angle modulated LO signal is also provided as a second phase (i.e. cosine phase) to the LO port of the Q mixer 170. The second phase is shifted 90 degrees relative to the first phase. The I and Q mixers 160 and 170 are configured to upconvert the I and Q signals to an IF frequency. A modulator control signal is coupled with the modulator VFO 180 and may trigger a modulation cycle of the modulator VFO 180. The modulation cycle may be generated by circuitry within the modulator VFO 180. The I and Q mixers 160 and 170 may be coordinate rotation digital computer (CORDIC) mixers or conventional digital multipliers. The quadrature phase splitter 185 may include at least one of a digital delay, a look up table, or mathematical computational circuitry to provide the first and second phases. The outputs of the I and Q mixers 160 and 170 are coupled with a digital to analog converter (DAC) 615. The DAC 615 may be an interpolating DAC, a binary-weighted DAC, or a pulse width modulator. An output of the DAC 615 provides the Tx IF signal to the Tx IF stage 610. A clock frequency of the DAC 615 may be a least two times a highest frequency of the Tx IF signal and the DAC 615 may include a voltage reference.

The Tx IF signal is coupled to an input of an IF mixer 125 (second mixer) via an IF low pass filter 150, an amplifier 145, and an attenuator 140. The IF low pass filter 150 may provide anti-aliasing for the DAC 615. The amplifier 145 and the attenuator 140 may provide power level adjustment and impedance matching for the input of the IF mixer 125. The amplifier 145 and mixer 125 may be implemented as described in any of the embodiments of the amplifier 145 and IF mixer 125 of the receiver 100 of FIG. 1.

The Tx IF stage 610 also includes an IF VFO 130 (second VFO), attenuators 120 and 135, and a bandpass filter 115. The IF VFO 130 is configured to provide the second angle modulated LO signal for the LO port of the IF mixer 125 via the attenuator 135. The IF mixer 125 is configured to upconvert the IF signal to an RF frequency. A Tx IF control signal may trigger a modulation cycle of the IF VFO 130. The Tx IF control signal may be a digital control signal and the second angle modulated LO signal may be an analog LO signal. The Tx IF control signal may be provided by a processor, an ASIC, an FPGA, or a DSP. The modulation cycle may be generated by circuitry within the IF VFO 130. The attenuator 135 may also provide impedance matching and power level adjustment for the LO port of the IF mixer 125. The attenuator 120 couples the output of the IF mixer 125 with the input of the bandpass filter 115 and may provide impedance matching for the output of the IF mixer 125 and the input of the RF bandpass filter 115.

An output of the RF bandpass filter 115 is configured to provide the RF signal. The output of the RF bandpass filter 115 may be a balanced or an unbalanced output. The RF bandpass filter 115 may be implemented as described in any of the embodiments of the RF bandpass filter 115 of the receiver 100 of FIG. 1. The output of the RF bandpass filter 115 may be directly coupled with an antenna configured to transmit the RF signal wirelessly over the air. In other embodiments, an RF splitter or an RF switch may be coupled between the antenna and the output of the RF bandpass filter 115. In other embodiments, the output of the RF bandpass filter 115 may be coupled to a power amplifier that is configured to boost a power level of the RF signal. In other embodiments, the output of the RF bandpass filter 115 may be coupled with at least one of a coax cable, a transmission line, an impedance matching transformer, or a resistive pad.

The modulation cycles of the modulator VFO 180 and the IF VFO 130 are configured such that the I, Q, and IF mixers 160, 170, and 125 provide a stable (i.e. stationary) frequency upconversion. The IF and modulator VFOs may also be coherent and linearly chirped as shown in FIG. 2 and FIG. 3.

In other embodiments, the transmitter 600 may be included in signal output circuitry of a radar system. The receiver 100 may also be implemented within signal output circuitry of an AM radio transmitter, an FM radio transmitter, or a broadcast TV transmitter.

In other embodiments, the transmitter 600 may be implemented within signal output circuitry of a wireless communication testing device, a radar testing device, or a wired broadband access testing device. The transmitter 600 may be configured to provide a reference signal to calibrate the testing device. The transmitter 600 may also be implemented within signal output circuitry of a communication device, such as a standard base station, a picocell, a femtocell, a microcell, a wireless local area network (WLAN) access point, a smart phone, a smart watch, a smart TV, a tablet, or a laptop.

In other embodiments, the transmitter 600 may be configured as a sub-millimeter wave transmitter configured to generate an output signal above 300 GHz. The sub-millimeter transmitter may be coupled with a waveguide to provide the output signal. The RF bandpass filter may include a transmission line stub filter. In other embodiments, the RF bandpass filter may include waveguide technology. The IF mixer 125 may include a corner cube mixer. The IF VFO 130 may also include a phase-locked-loop to multiply the frequency of the output of an NCO from an RF frequency to a sub-millimeter wave frequency. In other embodiments the phase-locked-loop may be replaced by a frequency multiplier circuit including a nonlinear component and a bandpass filter. The modulator stage 610 may implemented as described in FIG. 6. The sub-millimeter transmitter may be implemented within a communication device or a test device.

In other embodiments, the transmitter 600 may be configured as an optical transmitter to generate an optical signal in the infrared spectral region between 300 GHz and 300 THz. In other embodiments, the optical signal may be generated in the ultraviolet spectral region above 300 THz. The optical transmitter may be coupled with an optical amplifier, a lens, or an optical fiber to provide the optical signal. The RF bandpass filter 115 may be replaced with an optical filter. The optical filter may be implemented within the lens or the optical fiber. The attenuators 120, 135, and 140 may be replaced with optical attenuators. The IF mixer 125 may be replaced with an optical mixer that may include at least one non-linear optical component. The IF VFO 130 may be replaced with a linear chirped optical source including a laser. The amplifier 145 may be replaced with an electrical to optical converter (e.g. analog laser) to translate the Tx IF signal from electrical to optical. The modulator stage 605 of the optical transmitter may implemented as described in FIG. 6. The optical transmitter may be implemented within an optical test device or an optical communication device. The optical transmitter may also be implemented as a module including semiconductor circuitry for the modulator stage 605 and a photonic integrated circuit for the Tx IF stage 610.

In other embodiments, the transmitter 600 may be implemented within any device or system requiring frequency upconversion and spectral spreading of spurs or unwanted images using one or more frequency mixers.

Figure 7:
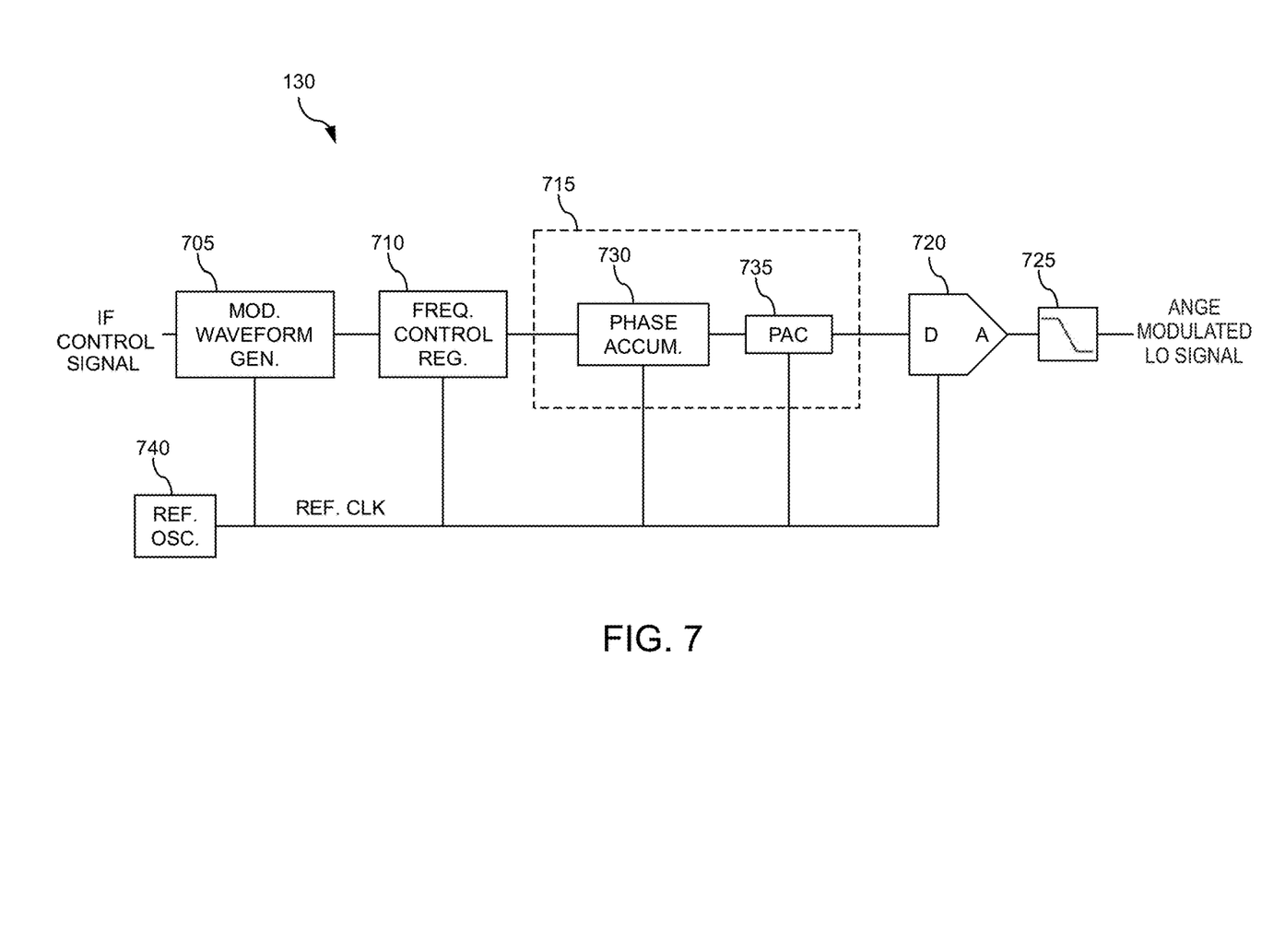
FIG. 7 is a diagram of the IF VFO in accordance with embodiments of the present disclosure.

FIG. 7 illustrates a diagram of an embodiment of the IF VFO 130 in accordance with embodiments of the present disclosure. An input of a modulation waveform generator 705 is configured to receive an IF control signal. The IF control signal may be the Rx IF control signal of the receiver 100 of FIG. 1 or the Tx IF control signal of the transmitter 600 of FIG. 6. An output of the modulation waveform generator 705 is digitally coupled with an input to a frequency control register 710. An output of the frequency control register 710 is digitally coupled with an input of an NCO 715. An output of the NCO 715 is digitally coupled with an input of a DAC 710. The output of NCO 715 provides a direct digitally synthesized sine wave. An output of the DAC 710 is coupled with an input of a reconstruction filter 715. An output of the reconstruction filter 725 is configured to provide the first angle modulated LO signal of the receiver 100 of FIG. 1 or the second angle modulated LO signal of the transmitter 600 of FIG. 6.

The modulation waveform generator 705 provides a frequency deviation (i.e. frequency control) setting to the NCO 715. For example, the modulation waveform generator 705 may include up/down digital counter circuitry to provide the triangle waveform of FIG. 2 to the input of the frequency control register 710. The up/down digital counter may provide between 8 and 16 bits of digital resolution.

The NCO 715 includes a phase accumulator 730 digitally coupled in series with a phase-to-amplitude converter (PAC) 735. The output of the frequency control register 710 is digitally coupled with the phase accumulator 720 and is configured to set an instantaneous frequency of the NCO 715. The phase accumulator 730 may include a counter configured to provide a sawtooth waveform to the PAC 735.

An output of the PAC 735 provides the output for the NCO 715 and is a digital representation of the angle modulated LO signal. The PAC may be a look up table and may be configured to provide between 8 and 16 bits of digital resolution for the DAC 720. The look up table may be a read only memory.

A reference oscillator 740 provides a reference clock for the modulation waveform generator 705, the frequency control register 710, the phase accumulator 730 and the PAC 735. The reference oscillator 740 may be frequency locked via a phase-lock-loop to another system clock in the receiver 100 of FIG. 1 or transmitter 600 of FIG. 6. Accuracy and stability of the NCO 715 may be primarily limited by the accuracy and stability of the reference oscillator 740.

In other embodiments, the demodulator VFO 180 may include the modulation waveform generator 705, the frequency control register 710, the NCO 715, and the reference oscillator 740 of FIG. 7. An input of the modulation waveform generator 705 may be configured to receive a control signal. The demodulator control signal may be the demodulator control signal of the receiver 100 of FIG. 1 or the modulator control signal of the transmitter 600 of FIG. 6. An output of the NCO 715 may be digitally coupled with the quadrature phase splitter 185 for the receiver 100 of FIG. 1 or the transmitter 600 of FIG. 6. In other embodiments, the NCO 715 may be configured to directly provide the first and second phases of the quadrature phase splitter 185, wherein the second phase is shifted 90 degrees relative to the first phase. For example the PAC 725 may include a sine PAC and a cosine PAC to provide the first and second phases.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Therefore, the embodiments disclosed should not be limited to any single embodiment, but rather should be construed in breadth and scope in accordance with the appended claims.

What is claimed is:

1. A radio frequency (RF) receiver comprising:
   a first mixer configured to receive an RF signal and provide an intermediate frequency (IF) signal;
   a second mixer coupled with the first mixer and configured to receive the IF signal and provide a baseband signal;
   a first variable frequency oscillator (VFO) coupled with the first mixer and configured to provide a first angle modulated LO signal; and
   a second VFO coupled with the second mixer and configured to provide a second angle modulated LO signal, wherein the first and second angle modulated LO signals are coherent and linearly chirped to provide a stable frequency downconversion.

2. The RF receiver of claim 1, wherein the first and second angle modulated LO signals spread spectral energy of spurs over a frequency band.

3. The RF receiver of claim 1, wherein the first and second VFOs each comprise a numerically controlled oscillator (NCO), and the first and second angle modulated LO signals are direct digitally synthesized sine waves.

4. The RF receiver of claim 3, further comprising an analog-to-digital converter (ADC) coupled between the first mixer and the second mixer.

5. The RF receiver of claim 4, wherein the first angle modulated LO signal is an analog signal and the second angle modulated LO signal comprises a plurality of digital signals.

6. The RF receiver of claim 5, wherein the first mixer is an analog mixer and the second mixer is a digital mixer.

7. The RF receiver of claim 1, wherein the RF receiver is implemented within signal input circuitry of a radar system, a testing device, a communication device, an amplitude modulation (AM) radio receiver, a frequency modulation (FM) radio receiver, or a broadcast television (TV) receiver.

8. The RF receiver of claim 1, wherein the RF receiver is implemented within signal input circuitry of a spectrum analyzer, a vector signal analyzer (VSA), a vector network analyzer (VNA), a wireless communication testing device, a radar testing device, or a wired broadband access testing device.

9. The RF receiver of claim 1, wherein the RF receiver is implemented within signal input circuitry of a standard base station, a picocell, a femtocell, a microcell, a wireless local area network (WLAN) access point, a smart phone, a smart watch, a smart TV, a tablet, or a laptop.

10. A method of processing a radio frequency (RF) signal by an RF receiver, the method comprising:
    mixing and filtering the RF signal with a first angle modulated local oscillator (LO) signal to provide an intermediate frequency (IF) signal; and
    mixing and filtering the IF signal with a second angle modulated LO signal to provide a baseband signal, the first and second angle modulated LO signals having a linear relationship wherein a second angle modulation of the second angle modulated LO signal has a cancelling effect on a first angle modulation of the first angle modulated LO signal in relation to frequency downconversion, providing a stable frequency downconversion.

11. The method of claim 10, wherein the first and second angle modulated LO signals are linearly chirped to further provide the stable frequency downconversion.

12. The method of claim 11, wherein the first and second angle modulated LO signals are configured to spread spectral energy of spurs over a frequency band.

13. The method of claim 12, wherein the RF receiver comprises:
    a first mixer coupled with a second mixer;
    a first variable frequency oscillator (VFO) coupled with the first mixer; and
    a second VFO coupled with the second mixer.

14. The method of claim 13, wherein the first and second VFOs each comprise a numerically controlled oscillator (NCO), and the first and second angle modulated LO signals are direct digitally synthesized sine waves.

15. The method of claim 13, wherein:
    the first angle modulated LO signal is an analog signal;
    the second angle modulated LO signal comprises a plurality of digital signals; and
    the RF receiver further comprising an analog-to-digital converter (ADC) coupled between the first mixer and the second mixer.

16. The method of claim 10, wherein the method is implemented within signal input circuitry of at least one of a radar system, a testing device, a communication device, an amplitude modulation (AM) radio receiver, a frequency modulation (FM) radio receiver, or a broadcast television (TV) receiver.

17. The method of claim 10, wherein the method is implemented within signal input circuitry of a spectrum analyzer, a vector signal analyzer (VSA), a vector network analyzer (VNA), a wireless communication testing device, a radar testing device, or a wired broadband access testing device.

18. The method of claim 10, wherein the method is implemented within signal input circuitry of a standard base station, a picocell, a femtocell, a microcell, a wireless local area network (WLAN) access point, a smart phone, a smart watch, a smart TV, a tablet, or a laptop.

19. A radio frequency (RF) receiver comprising:
- a first mixer configured to receive an RF signal and provide an intermediate frequency (IF) signal;
- a second mixer coupled with the first mixer and configured to receive the IF signal and provide a baseband signal;
- a first variable frequency oscillator (VFO) coupled with the first mixer and configured to provide a first angle modulated LO signal; and
- a second VFO coupled with the second mixer and configured to provide a second angle modulated LO signal, wherein the first and second mixers provide a stable frequency downconversion over modulation cycles of the first and second angle modulated LO signals,
- wherein the first and second angle modulated LO signals are configured to spread spectral energy of spurs over a frequency band, and
- wherein the first and second angle modulated LO signals are coherent and linearly chirped to further provide the stable frequency downconversion.

* * * * *